(12) United States Patent
Myers et al.

(10) Patent No.: US 9,178,347 B2
(45) Date of Patent: Nov. 3, 2015

(54) TELESCOPING EXTENSION ARM FOR SUPPORTING A MONITOR

(71) Applicant: A-dec, Inc., Newberg, OR (US)

(72) Inventors: Jonathan E. Myers, Portland, OR (US); J. Rick Halbirt, Hubbard, OR (US); Bruno F. Zadnik, Redmond, OR (US); David Anthony Hovenden, Salem, OR (US); Daniel Richard Tucholsky, McMinnville, OR (US); Henry Warn Jackson, Sherwood, OR (US); Alexander Aliiloa Rice, Beaverton, OR (US); Jared Gene Tippets, Newberg, OR (US)

(73) Assignee: A-dec, Inc., Newberg, OR (US)

( * ) Notice: Subject to any disclaimer, the term of this patent is extended or adjusted under 35 U.S.C. 154(b) by 111 days.

(21) Appl. No.: 14/073,138

(22) Filed: Nov. 6, 2013

(65) Prior Publication Data

US 2015/0122955 A1    May 7, 2015

(51) Int. Cl.
*F16L 3/00*    (2006.01)
*H02G 11/00*    (2006.01)
*F16M 13/02*    (2006.01)
*F16M 11/10*    (2006.01)
(Continued)

(52) U.S. Cl.
CPC ............. *H02G 11/003* (2013.01); *F16M 11/10* (2013.01); *F16M 11/2014* (2013.01); *F16M 11/2085* (2013.01); *F16M 11/28* (2013.01); *F16M 13/02* (2013.01); *F16M 13/022* (2013.01); *A47B 2097/005* (2013.01); *F16M 2200/048* (2013.01)

(58) Field of Classification Search
CPC ........... A47B 97/001; A47B 2097/003; A47B 2097/005; F16M 13/022; H02G 11/003
USPC ......................................................... 248/51
See application file for complete search history.

(56) References Cited

U.S. PATENT DOCUMENTS 5,249,881 A * 10/1993 Austin et al. .................. 403/378
5,340,072 A *  8/1994 Halbirt ........................ 248/279.1
(Continued)

FOREIGN PATENT DOCUMENTS

| EP | 1066794 | 1/2001 |
|---|---|---|
| WO | WO2006/095301 | 9/2006 |
| WO | WO2008/128556 | 10/2008 |

OTHER PUBLICATIONS

European Search Report for EP14191662.7, (mailed Apr. 29, 2015), 7 pages.

*Primary Examiner* — Mark Wendell
(74) *Attorney, Agent, or Firm* — Klarquist Sparkman, LLP

(57) ABSTRACT

An arm for supporting a monitor comprises a telescoping arm assembly, a support member and a cord storage device. The telescoping arm assembly has at least first and second telescoping members telescopingly movable relative to each other, a distal end configured to support a monitor and a hollow interior through which at least one cord from the monitor can be routed. The support member is connected to the telescoping arm assembly proximally of the distal end to suspend the telescoping arm assembly. The support member is configured to extend transverse to the telescoping arm assembly and to be attached to a support surface. The cord storage device is positioned at least partially within at least one of the telescoping arm assembly or the support member. The cord storage device winds and unwinds the cord from the monitor as the first and second telescoping members are moved toward and away from each other, respectively.

25 Claims, 21 Drawing Sheets

(51) Int. Cl.
　　　*F16M 11/20*　　(2006.01)
　　　*F16M 11/28*　　(2006.01)
　　　*A47B 97/00*　　(2006.01)

(56) References Cited

U.S. PATENT DOCUMENTS

| | | |
|---|---|---|
| 5,405,117 A | 4/1995 | Davis |
| 8,177,174 B2 | 5/2012 | Griepentrog |
| 8,286,927 B2 | 10/2012 | Sweere et al. |
| 8,288,973 B2 | 10/2012 | Ford |
| 2004/0178312 A1 | 9/2004 | Parsons |
| 2005/0022699 A1* | 2/2005 | Goza .................. 108/50.01 |
| 2006/0071138 A1 | 4/2006 | Steger et al. |
| 2007/0295870 A1* | 12/2007 | Peterson et al. ........ 248/125.7 |
| 2013/0092805 A1* | 4/2013 | Funk et al. ............. 248/121 |
| 2013/0126682 A1 | 5/2013 | Tholkes et al. |
| 2013/0200579 A1* | 8/2013 | Abernethy et al. ....... 280/6.15 |
| 2014/0096706 A1* | 4/2014 | Labrosse et al. ........... 108/21 |

* cited by examiner

TELESCOPING EXTENSION ARM FOR SUPPORTING A MONITOR

BACKGROUND

This application relates to extension arms for supporting equipment, and specifically to an arm for supporting a monitor in a dental or medical setting.

In today's dental practices, there is increasing demand for display of information on computer monitors or other similar display devices. Some information, such as a patient's digital radiographs and proposed treatment plans for the patient, may be shared with the patient on a monitor visible to the patient to facilitate explaining what treatment is recommended and how it will be administered. The monitor visible to the patient may also be used to show video entertainment to the patient. More important, a separate monitor, primarily configured for use by the dentist, surgeon or dental assistant for use in treatment, is also provided. This treatment monitor can be used to display digital radiographs, other test results, reference information and live video feed from an intraoral camera or other device, as just several examples, to assist the caregivers.

Conventional monitor mounts do not allow the monitor to be positioned in as wide of a range of positions as is desired. The positioning of the treatment monitor needs to be flexible to allow for effective viewing in different situations, such as by one care giver or by two care givers simultaneously. The monitor must be quickly repositionable to allow for its use in different treatments, as well as to allow it to be moved to allow access by personnel to other equipment and nearby areas.

SUMMARY

Described below are embodiments of an arm for supporting a monitor that address some of the disadvantages of conventional monitor arms.

According to a first implementation, an arm for supporting a monitor comprises a telescoping arm assembly, a support member and a cord storage device. The telescoping arm assembly has at least first and second telescoping members telescopingly movable relative to each other, a distal end configured to support a monitor and a hollow interior through which at least one cord from the monitor can be routed. The support member is connected to the telescoping arm assembly proximally of the distal end to suspend the telescoping arm assembly. The support member is configured to extend transverse to the telescoping arm assembly and to be fixed to a support surface. The cord storage device is positioned at least partially within at least one of the telescoping arm assembly or the support member. The cord storage device winds and unwinds the cord from the monitor as the first and second telescoping members are moved toward and away from each other, respectively.

The arm can comprise a load balancing device positioned at least partially within at least one of the telescoping arm assembly and the support member and configurable to exert a force to counteract a load exerted by any attached monitor. The load balancing device can comprise an air cylinder. The load balancing device can comprise an air cylinder having a regulator adjustable to balance the load. Alternatively, the load balancing device can comprise a spring or other similar device to counteract at least a portion of the load.

The telescoping arm assembly can be configured to extend approximately vertically, and the support member can be configured to extend approximately horizontally. The support member can be configured for attachment to an approximately horizontal support surface with the telescoping arm assembly suspended approximately vertically from the support member. The telescoping arm assembly can provide at least about ten inches of travel.

The load balancing device can have a movable end connected to the movable pulley of the cord storage device. The load balancing device can be configured to move with the cord storage device. The load balancing device can be substantially enclosed within the arm.

The cord storage device can comprise a fixed pulley and a movable pulley about which the cord is stored, and wherein the movable pulley translates relative to the fixed pulley as the first and second telescoping members are moved towards and away from each other. The cord storage device can be substantially enclosed within the arm.

The fixed pulley and the movable pulley can each configured to store a first cord, a second cord and a load supporting cable. The first cord can be a power cord and the second cord can be a video cord. The first and second fixed pulleys can have a common rotational axis. Similarly, the first and second movable pulleys have a common rotational axis.

The arm can comprise a brake actuatable to lock the first and second telescoping members at a desired position relative to each other.

The telescoping arm assembly can be pivotably connected to the support member.

The arm can comprise a track configured for attachment to a support surface and defining a lateral axis, and the support member can be slidably mountable to the track such that the distal end of the telescoping arm assembly can be translated laterally by moving the support member along the track. The track can be configured for mounting to a top surface of a dental cabinet.

In some implementations, the track can be configured for mounting adjacent a front side of a cabinet, and the support member can be positionable to extend beyond the front side of the cabinet and pivotable such that at outer track positions, the support member can be pivoted through an angle greater than 70 degrees to position the telescoping arm assembly and any attached monitor adjacent one of the sides of the cabinet bordering the front side. In some implementations, the support member can be pivoted to position any attached monitor adjacent a back side of the cabinet.

The support member can be pivotably mountable to a support surface. The support member can include a cord opening through which an end of the cord can be routed for connection to a source of power or to another component. The cord opening is positioned to be adjacent to a support surface to which the support member is attached.

The foregoing and other objects, features, and advantages will become more apparent from the following detailed description, which proceeds with reference to the accompanying figures.

DETAILED DESCRIPTION

Described below are embodiments of an arm for supporting a piece of equipment, such as a monitor, particularly for use in a dental or medical operatory.

Figure 1:
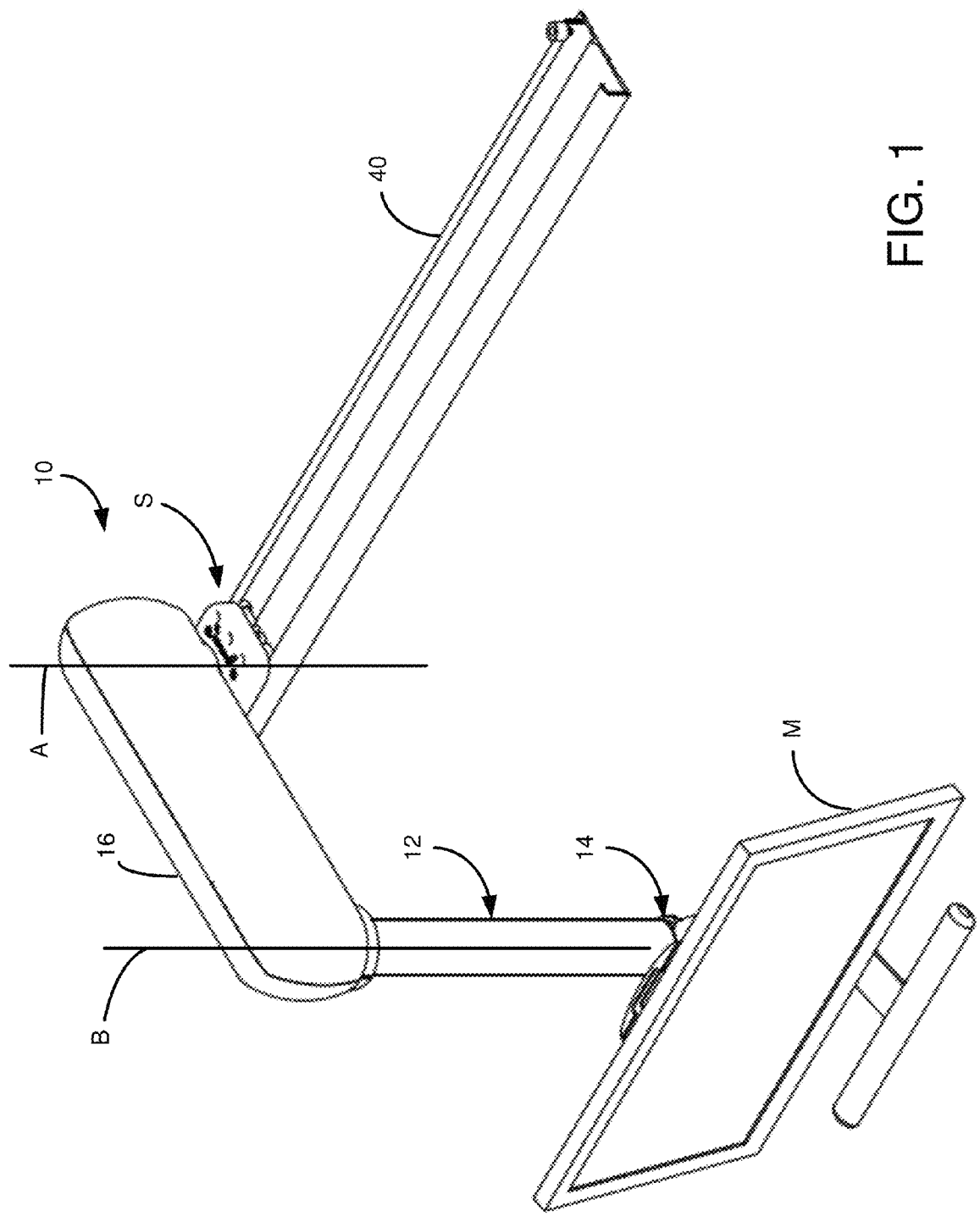
FIG. 1 is a perspective view of an arm for supporting a monitor.

FIG. 1 is a perspective view of an arm 10 according to one embodiment. As shown, the arm 10 has a telescoping arm assembly 12 with a distal end 14 to which a monitor M is attached. Power and/or data cords from the monitor M are routed through internal spaces in the telescoping arm assembly 12 and an attached support member 16 from which the telescoping arm assembly is suspended. A cord storage device 20, which is not visible in FIG. 1 but is described below in greater detail, allows the cord or cords to be stored and manages them as the arm 10 is moved through its full range of motion. The telescoping arm assembly 12 is typically positioned vertically, and is pivotably connected to a distal end of the support member 16. The support member 16 is in turn connected to a support surface S. In the illustrated implementation, a proximal end of the support member 16 is slidably connected to the support surface S via a track assembly 40. In other embodiments, the track assembly 40 may be omitted and the support member 16 may be pivotably connected directly to the support surface S.

In the implementation shown in FIG. 1, the monitor M may be moved vertically along an axis B of the telescoping arm assembly 12, pivoted about the axis B and pivoted about the axis A at the connection between the support member 16 and the support surface S. As provided, the monitor M may also be translated laterally along the length of the track assembly 40. As will be described in further detail below, the monitor M may be provided with additional adjustability.

Figure 2:
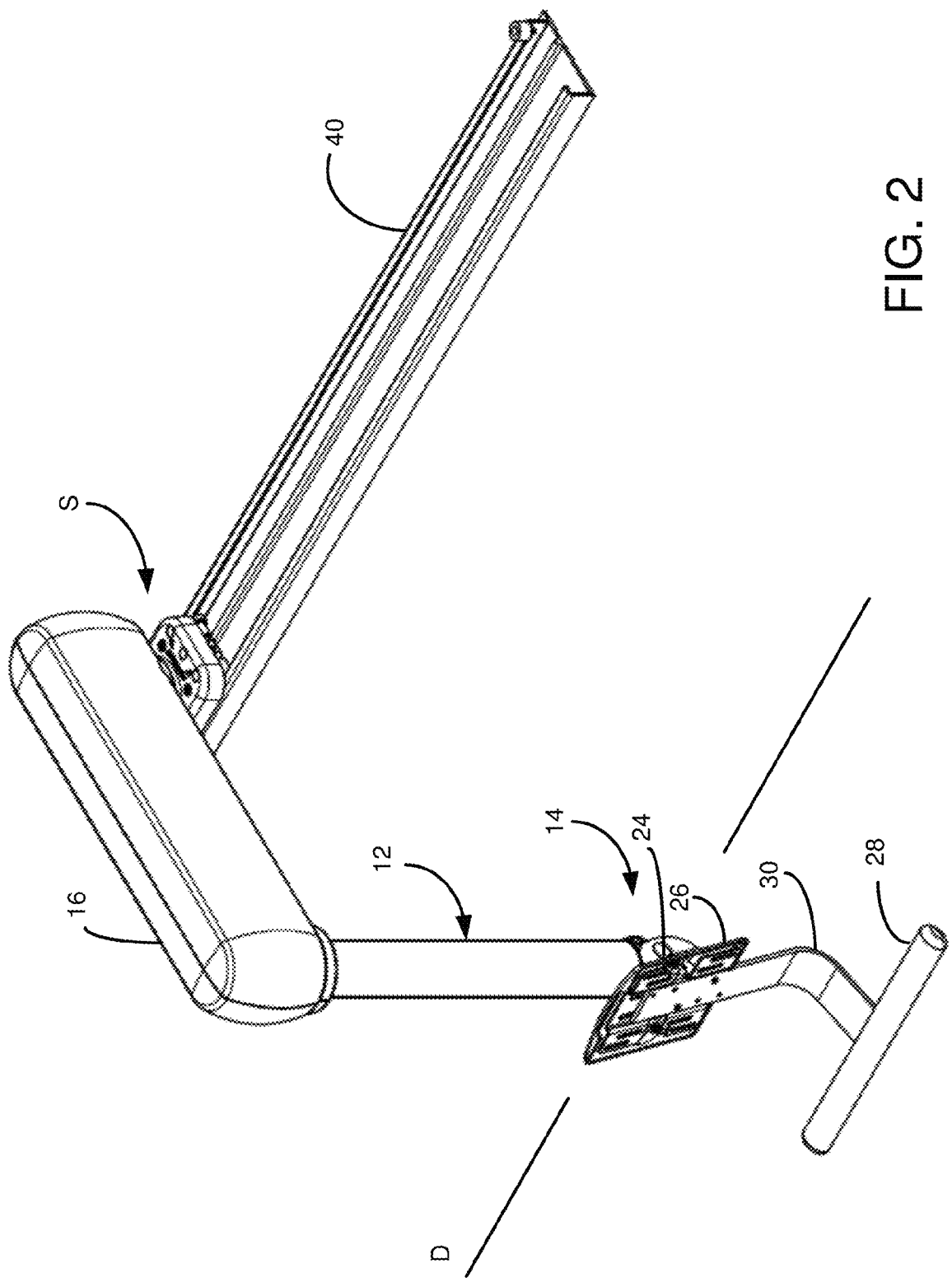
FIG. 2 is a perspective view of the arm similar to FIG. 1, except with the monitor removed to show a monitor mounting bracket.

FIG. 2 is similar to FIG. 1, but shows the distal end 14 of the telescoping arm assembly 12 in more detail. As shown, the distal end 14 can be fitted with an adjustable mount 24 to which a monitor bracket 26 is pivotably connected. Thus, the monitor M can also be pivoted as desired about the axis D. In some implementations, the mount 24 allows the monitor to be rotated, such as between landscape and portrait orientations. A handle 28, which is connected to the bracket 26 by a handle mount 30, facilitates easy positioning of the monitor at any desired position within its range.

Figure 3:
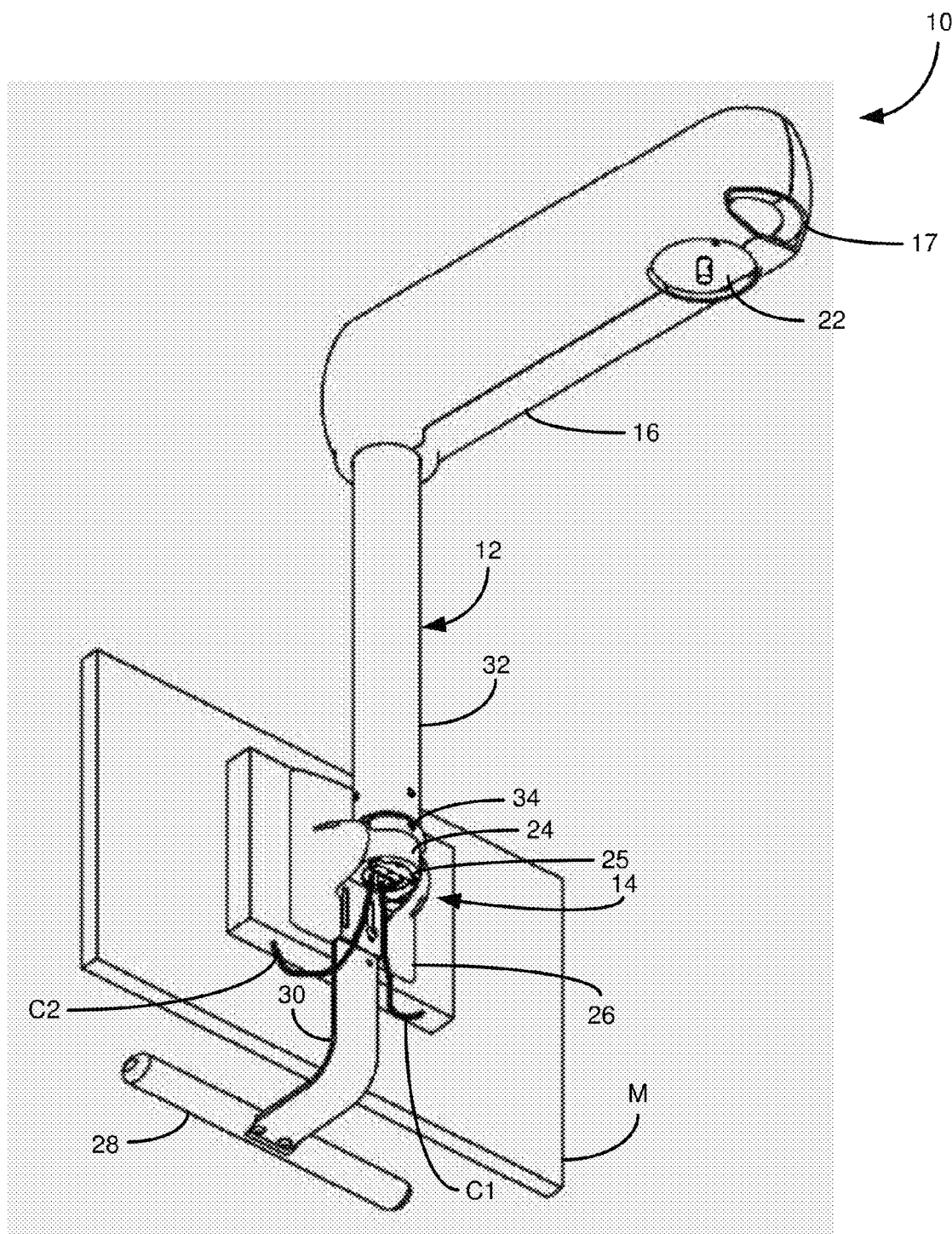
FIG. 3 is another perspective view of the arm showing a monitor from its rear side and the monitor's cables being routed through the arm.

FIG. 3 shows an implementation of the arm 10 from a rear side, illustrating that a power cord C1 and a data cord C2 extend from the monitor M and through an opening 25 at the distal end 14 of the telescoping arm assembly 12, and thus are routed through the arm 10. Although not shown in FIG. 3, the cords C1 and C2 are positioned to extend through an exit opening 17 in the support member 16 so they can be connected to a source of power and/or other components as appropriate.

In the illustrated telescoping arm assembly 12, there is a second telescoping member 34 positioned to extend from and retract into a first telescoping member 32. The orientation of the first and second telescoping members can be reversed, i.e., the first telescoping member 32 may be positioned within the second telescoping member 34. In addition, there may be more than two telescoping members. As also shown in FIG. 3, there is a mounting point 22 by which the support member 16 is mounted to the support surface S, either directly or indirectly (such as via the track assembly 40).

Figure 4:
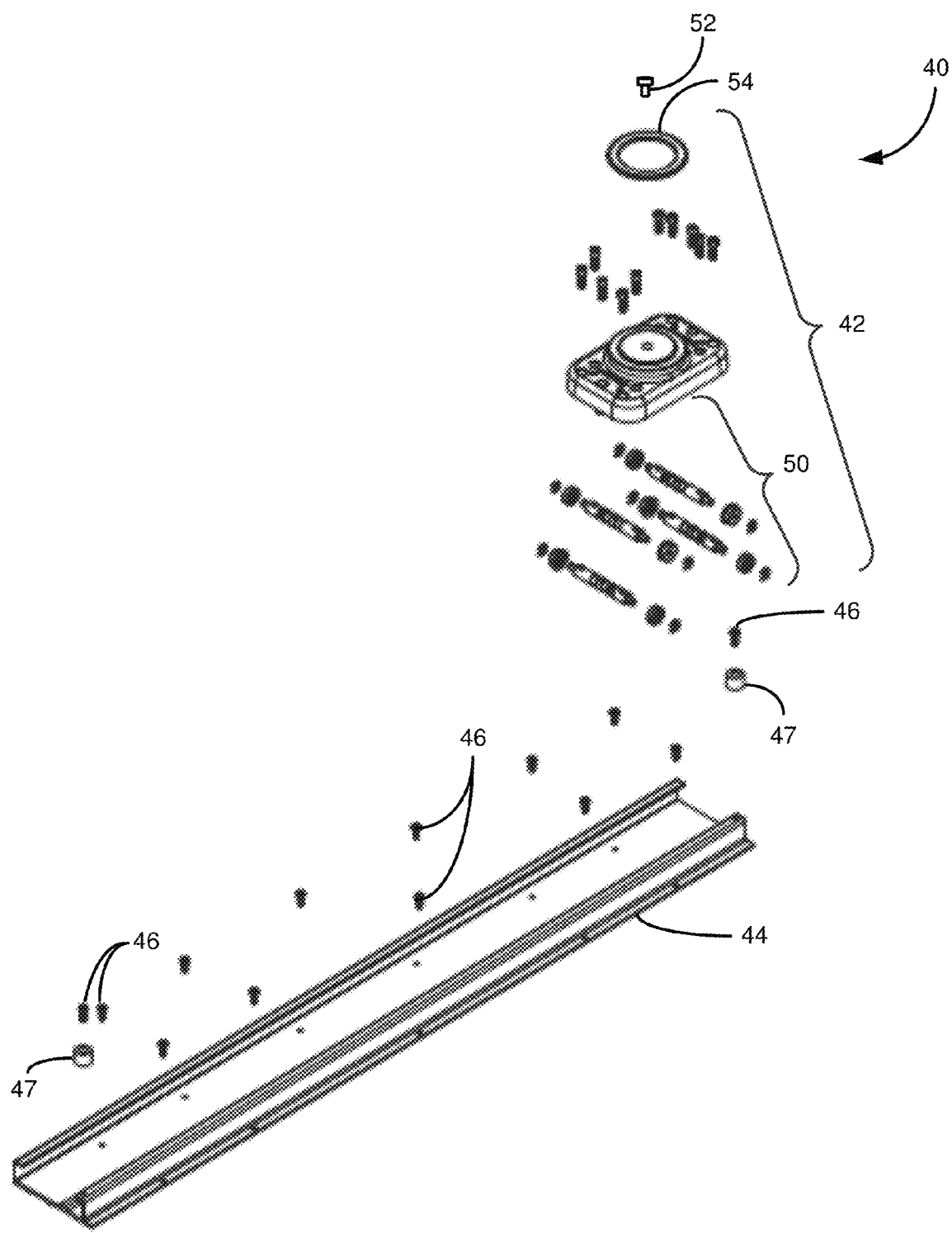
FIG. 4 is an exploded perspective view of an optional track assembly to which the arm can be mounted.

FIG. 4 is a perspective view of the optional track assembly 40. As illustrated, there is a slide assembly 42 configured to slide within or along a track member 44 to a desired position. If desired, a releasable locking mechanism can be provided to maintain the slide assembly 42 in the desired position. Multiple fasteners 46 are used to secure the track member 44 in place, such as on the support surface S. Stops 47 keep the slide assembly within the track member 44. A slide mount 48 is attached to the support member 16 at the mounting point 22 with a bolt 52. The slide mount 48 is fitted with slide axles 50, such as the four axles as shown, which are configured to be engaged in the track member 44 to allow the slide mount 48 to be slid back and forth along the track member 44. Component pieces of the slide mount 48 can be held together with fasteners. A bearing 54 can be installed between the slide mount 48 and the arm 16.

Figure 5:
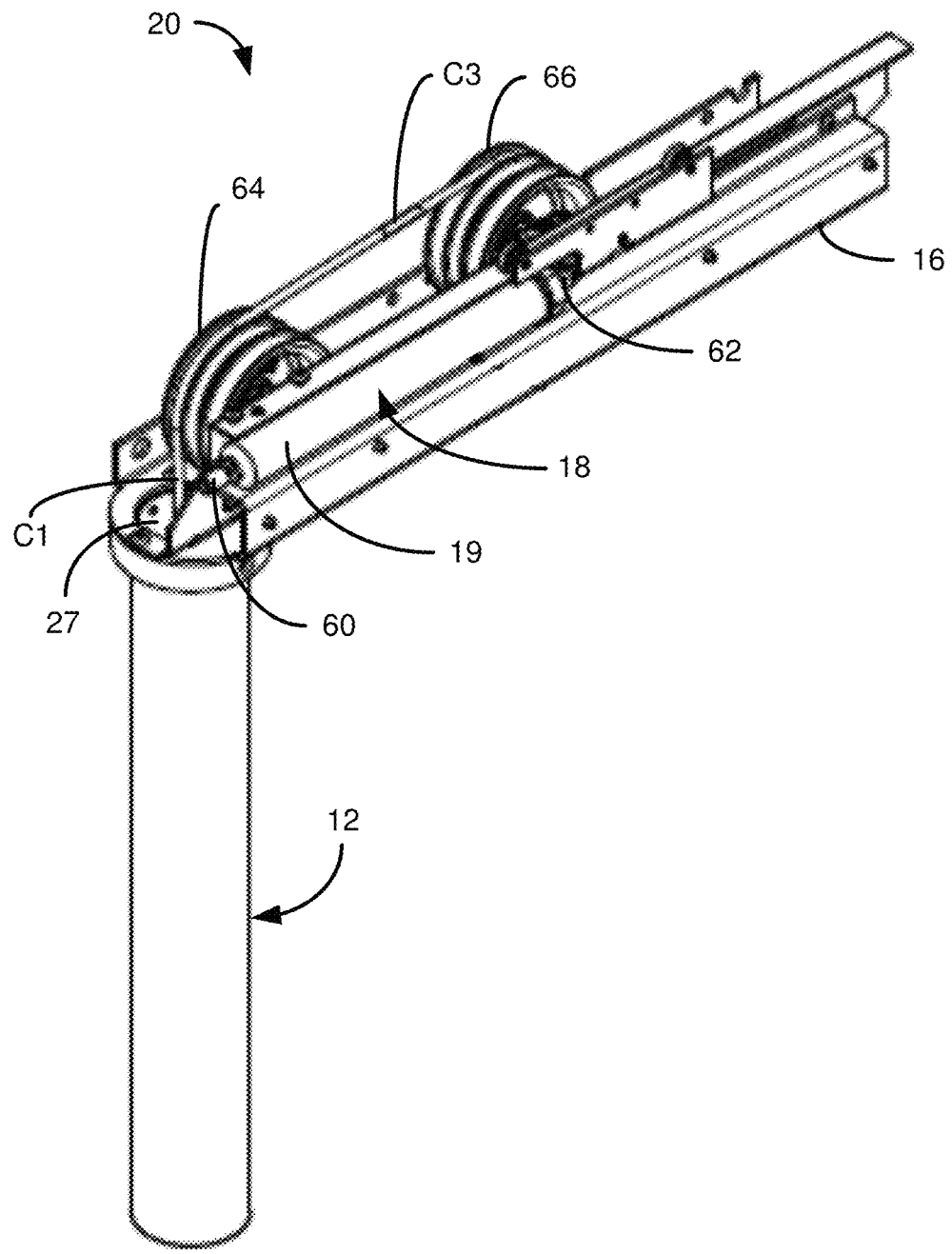
FIG. 5 is a perspective view of the arm with some exterior components removed to show interior components in more detail.

In FIG. 5, the arm 16 is shown without its exterior housing to illustrate the configuration of internal components, including the cord storage device 20. In addition to the cords C1, C2 from the monitor, the arm 10 includes a supporting cable C3 that is routed substantially in parallel with the cords C1, C2 so that it can support the weight of the monitor M and other components and the cords C1, C2 need not support any substantial weight. As can be seen at the left side of FIG. 5, the cable C3 extends upwardly from a hollow interior 27 of the telescoping arm assembly 12 and over a first pulley 64 before extending laterally to a second pulley 66. In one implementation, the first pulley 64 is a fixed pulley, and the second pulley 66 is a movable pulley that translates relative to the fixed pulley 64 as the telescoping arm assembly is extended or retracted, serving to take up excess of the support cable C3 as the telescoping arm assembly 12 is shortened or to pay it out as the telescoping arm assembly is lengthened. As can be seen in the figures, the pulleys 64, 66 can have additional sections or grooves to accommodate the cords C1, C2, which have been omitted from FIGS. 5-7 for clarity.

To assist in moving the monitor, there is a load balancing device 18, which is preferably housed within the arm 10. In the illustrated implementation, the load balancing device 18 is an air cylinder 19 having a fixed end 60 mounted adjacent the fixed pulley 64 and a movable end 62 mounted adjacent the movable pulley 66. The air cylinder 19 also has an optional regulator by which the amount of force it exerts can be adjusted, such as to accommodate monitors of different weights. With the air cylinder 19 set appropriately, the user need only exert a relatively light force on the handle 28 or another appropriate portion of the arm 10 to move the monitor M to its desired position. In particular, raising or lowering the monitor vertically does not require substantial force because the load balancing device 18 counteracts a majority of the load exerted by the monitor M and the other components depending from the arm 16.

Figure 6:
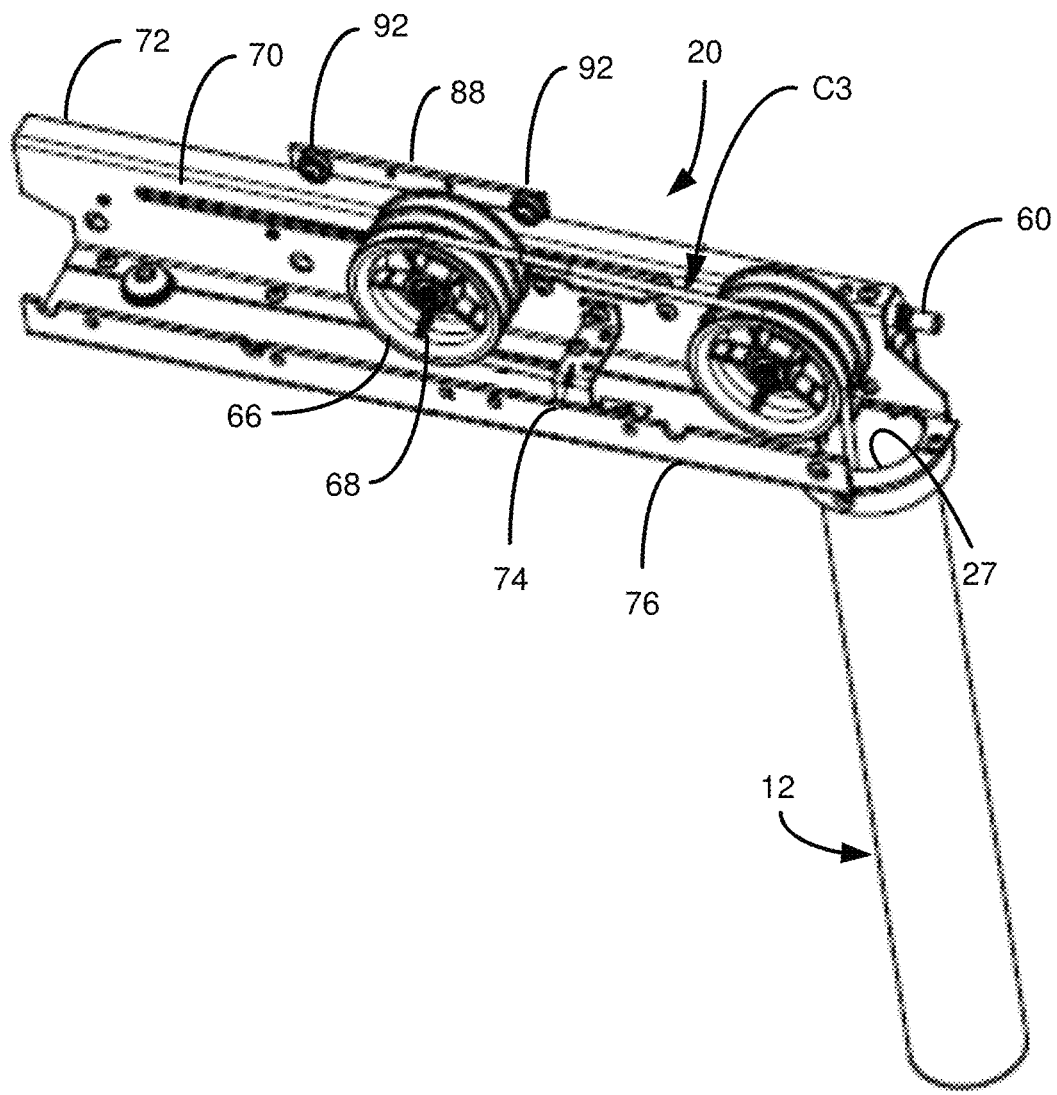
FIGS. 6 and 7 are additional perspective views similar to FIG. 5 but taken from different angles to show the interior components in more detail.
Figure 7:
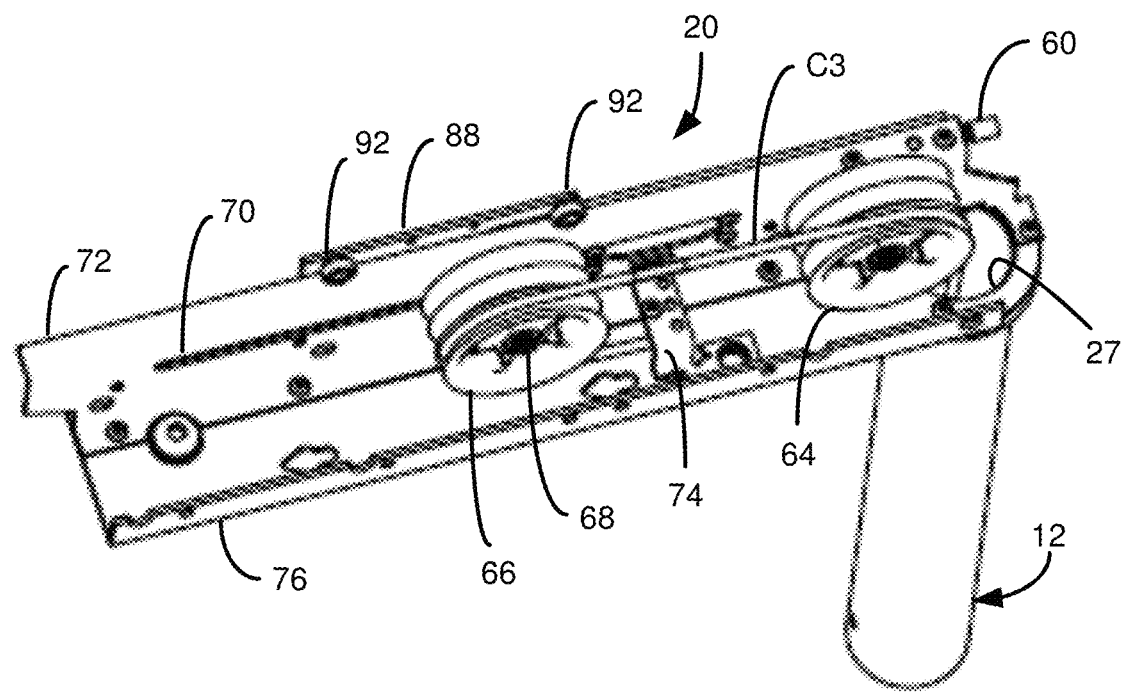

FIGS. 6 and 7 provide additional views of the cord storage device 20 and the configuration of its components. As shown and FIGS. 6 and 7, the movable pulley 66 rotates on a movable pulley axle 68 that extends through a slot 70 in a rail member 72 mounted to a base 76 of the arm 16. The other end of the axle 68 protrudes through a support plate 88 that is slidably mounted on support plate rollers 92 to slide along an upper surface of the rail member 72 as shown. Referring again to FIG. 5, as the telescoping arm assembly 12 is retracted (e.g., when the monitor M is raised), the movable end 62 of the air cylinder 19 extends to urge the support plate 88 away from the fixed pulley 64. The cable C3 is secured in place at a desired location along its length, such as at an end, to a cable attachment bracket 74 as shown. The other end of the cable C3 is attached at the distal end of the telescoping arm assembly 12.

If present, the cords C1, C2 would be routed along similar paths to the cable C3, except the remaining portions of the cords C1, C2 would extend through the support member 16 and out through the exit opening 17, and then to a source of power or another component, as appropriate.

Thus, as the telescoping arm assembly 12 is retracted, excess cable C3 is taken up or stored by extending the distance between the movable pulley 66 and the fixed pulley 64 over which the cord C3 is engaged. In the illustrated implementation, for each two inches that the telescoping arm assembly 12 is raised or lowered, the movable pulley 66 moves one inch away from or closer to the fixed pulley 64, respectively, to accommodate the change in cord length. In this way, the monitor M can be moved freely throughout its entire range without having its cord(s) cause any interference with the motion of the arm 10.

The pulleys can be provided with multiple wheels or multiple sections, such as is shown for the pulleys 64 and 66, with each of the wheels or sections accommodating one cord. In the illustrated implementation, each of the pulleys 64 and 66 can accommodate a total of four cords and cables.

Figure 8:
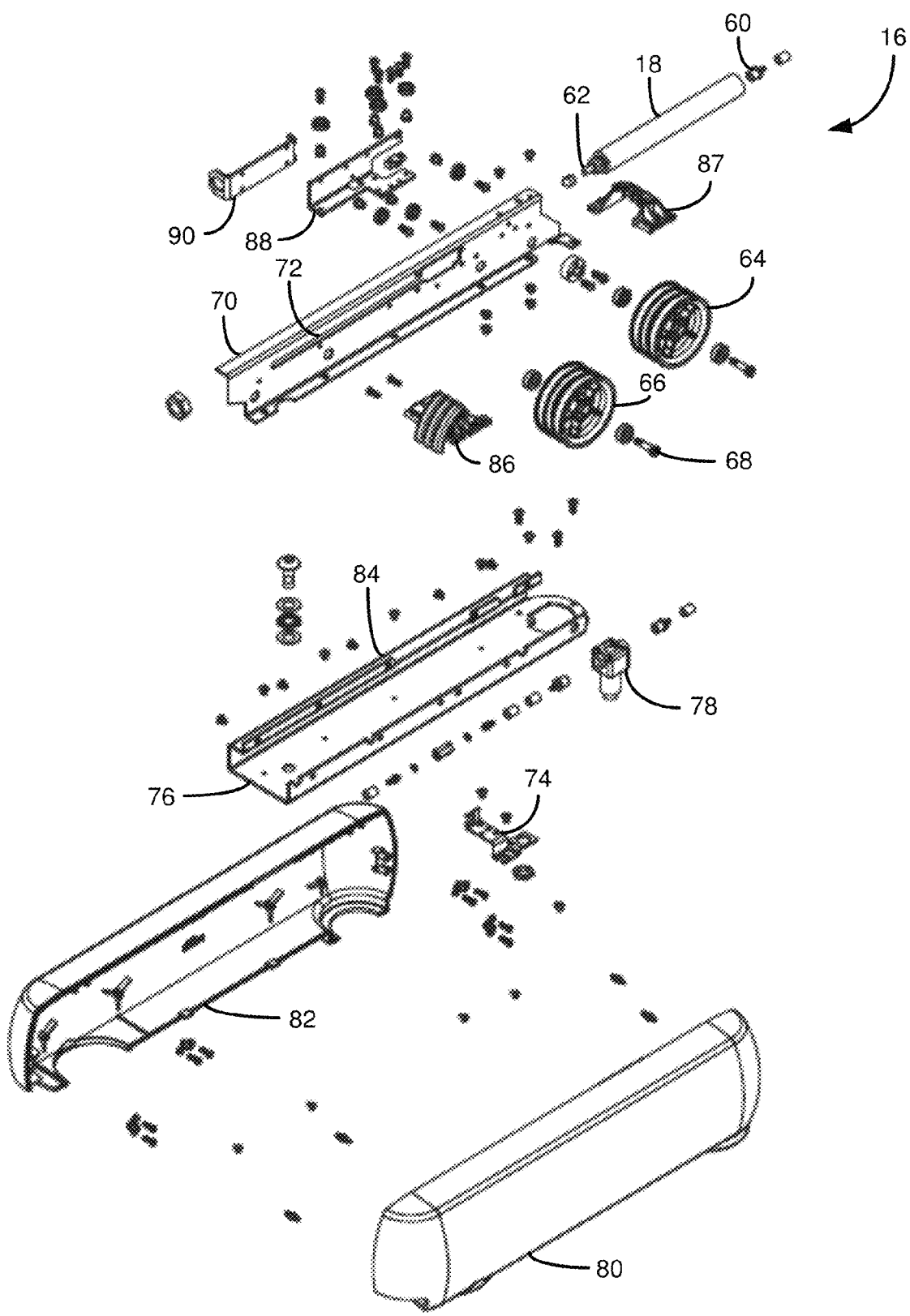
FIG. 8 is an exploded perspective view of a portion of the arm.

FIG. 8 is an exploded perspective view of the support member 16. As shown, a housing can be provided in multiple parts, e.g., housing parts 80, 82 that can be secured together with suitable fasteners. The cable attachment bracket 74 is attached to the base 76 with fasteners. There is a mounting attachment 78, which when assembled extends through the base 76 to provide the mounting point 22 as seen in FIG. 3. Cord retainers 86 and 87 are positioned within the arm 16 to keep the cords and cable aligned with the pulleys 64, 66 if any slack develops in the cords and cable.

Figure 9:
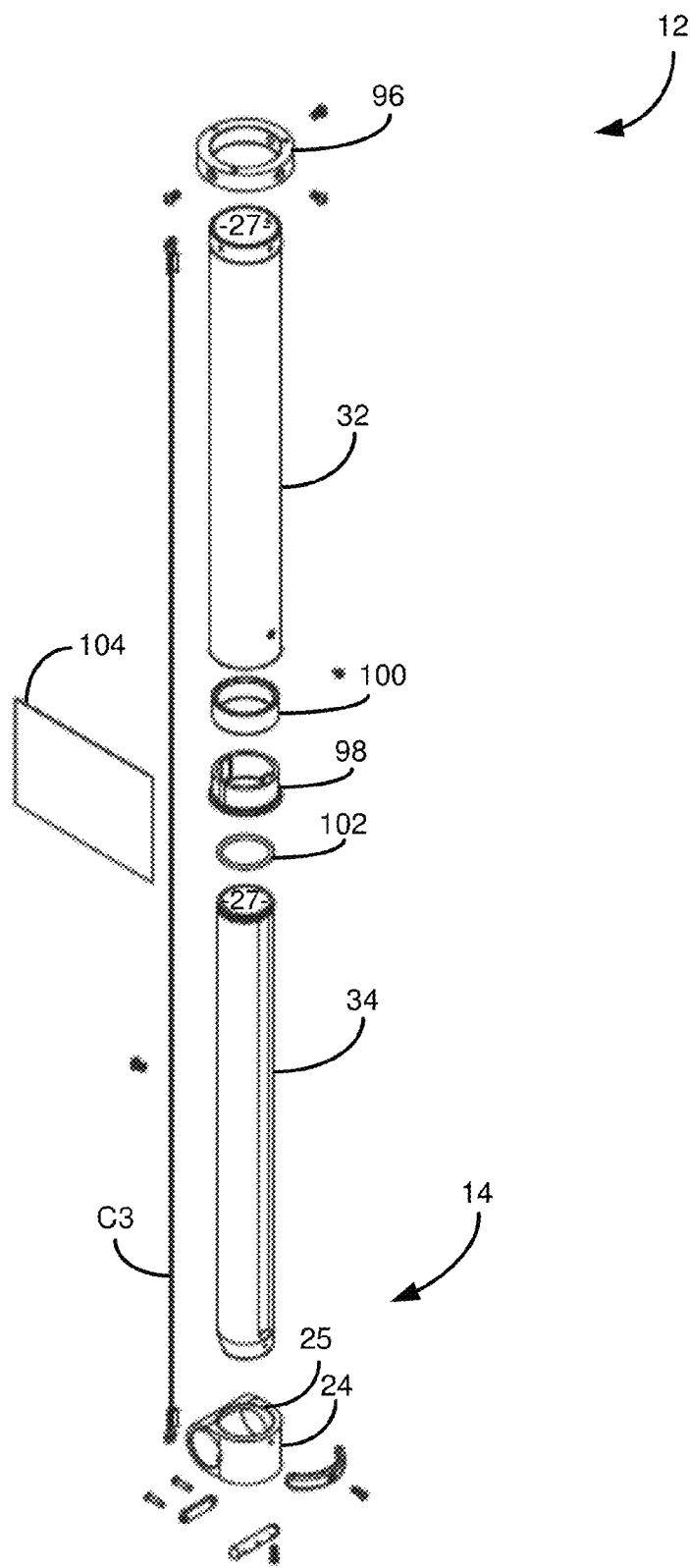
FIG. 9 is an exploded perspective view of a telescoping portion of the arm.

FIG. 9 is an exploded perspective view of the telescoping arm assembly 12. In the illustrated implementation, the first telescoping member 32 is stationary along the axis B, and the second telescoping member 34 can be extended or retracted relative to the first telescoping member 32. At the interface between the two telescoping members 32, 34, there is a bearing 100, a bearing 98 and a stop 102. As shown in FIG. 9, the cable C3 is preferably sized long enough to extend from its attachment adjacent the mount 24 at the distal end 14, through the hollow interior 27 and laterally along the support member 16 until it is attached at its other end at the cable attachment bracket 74 (FIG. 6). A spacer 104, which is shown before it has been rolled into a tubular shape, is inserted between the telescoping members 32, 34. At an upper end, the telescoping arm assembly 12 is connected to the support member 16 by a locking ring 96.

Figure 10:
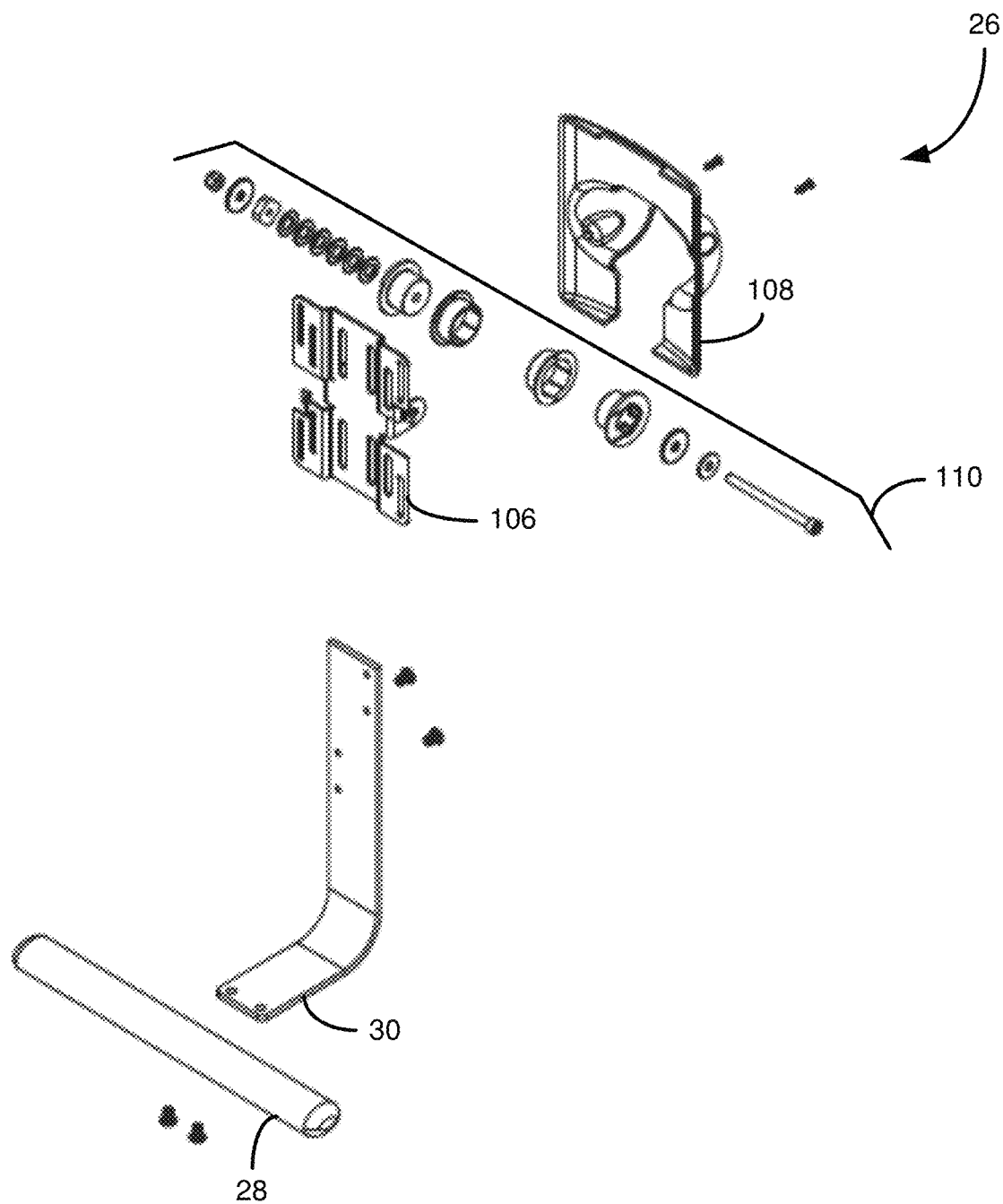
FIG. 10 is an exploded perspective view of the monitor bracket and handle.

As shown in FIG. 10, the monitor bracket 26 has an inner bracket part 106, which preferably provides a standardized mounting interface compatible with a wide range of monitors. The inner bracket part 106 is fitted to an outer cover part 108. As also shown, there is a pivot assembly 110 by which the bracket 26 is secured to the adjustable mount 24 and is permitted to pivot about the axis D (FIG. 2). The handle mount 30 can be adjustably positioned within the center portion of the inner bracket part 106 so that the handle 28 can be installed at a desired position relative to the monitor M.

Figure 11:
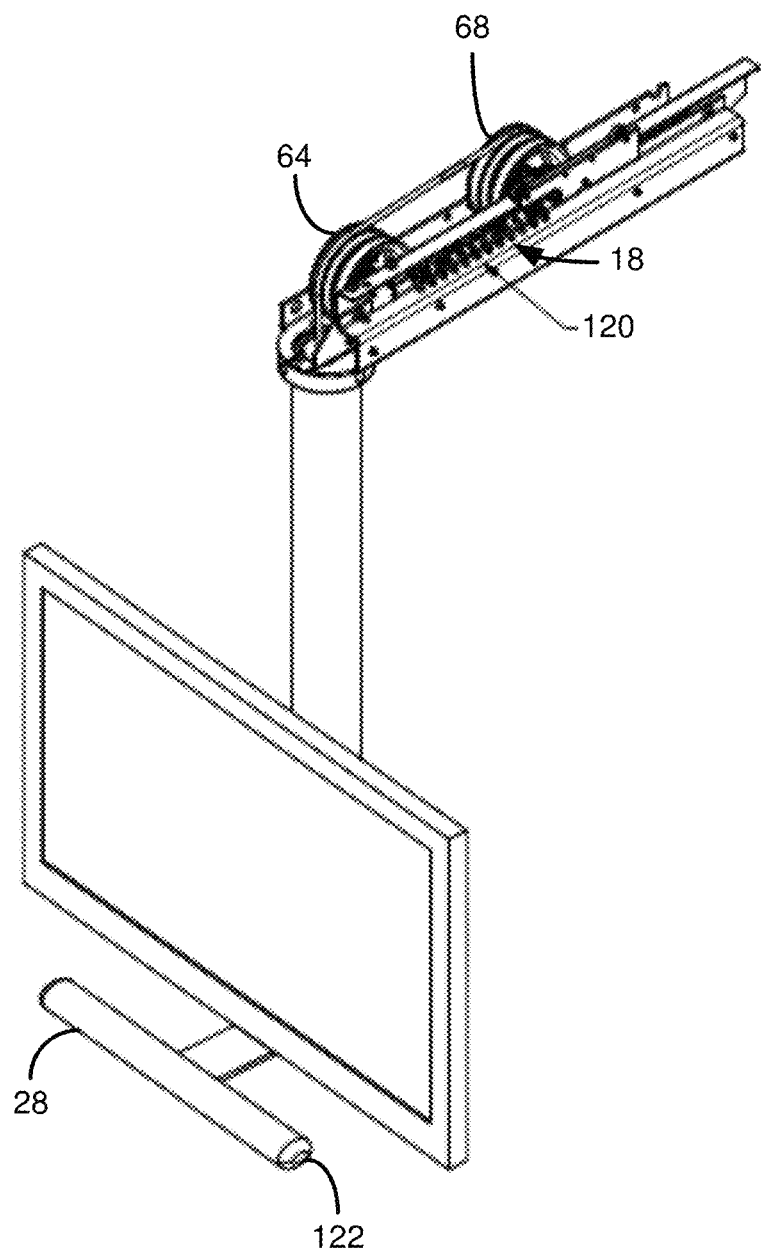
FIGS. 11 and 12 are perspective views of the arm showing an alternative load balancing arrangement.
Figure 12:
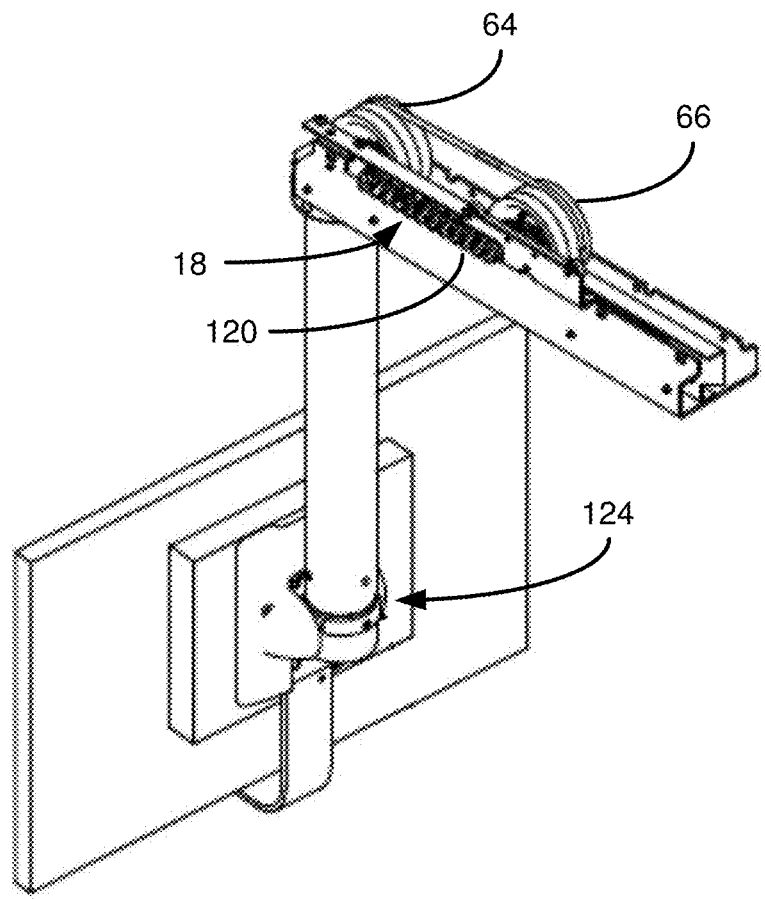

FIGS. 11 and 12 are perspective views showing an alternative embodiment of the arm in which the load balancing device 18 includes a spring 120 instead of the air cylinder 19. In addition, the arm of FIGS. 11 and 12 includes an optional brake and brake actuator.

Specifically, the spring 120 is mounted between the fixed pulley 64 and the mobile pulley 66. In the illustrated configuration, the spring 120 is configured to exert a force on the movable pulley 66 tending to urge it toward the fixed pulley 64. In the illustrated implementation, there is also a brake 124, such as a mechanical brake, air brake or electric brake, positioned at the intersection of the first telescoping member 32 and the second telescoping member 34. The brake 124 can be actuated, such as by the brake actuator 122 implemented in the handle 28, to actuate the brake and lock the positions of the first telescoping member 32 and second telescoping member 34 relative to each other, thus maintaining the monitor at a desired height. In addition to air cylinders and springs, the load balancing device 18 can include any device capable of providing a force to at least partially balance the load of the monitor. In addition, in the case of a lightweight monitor or special application, the load balancing device can be omitted.

Figure 13:
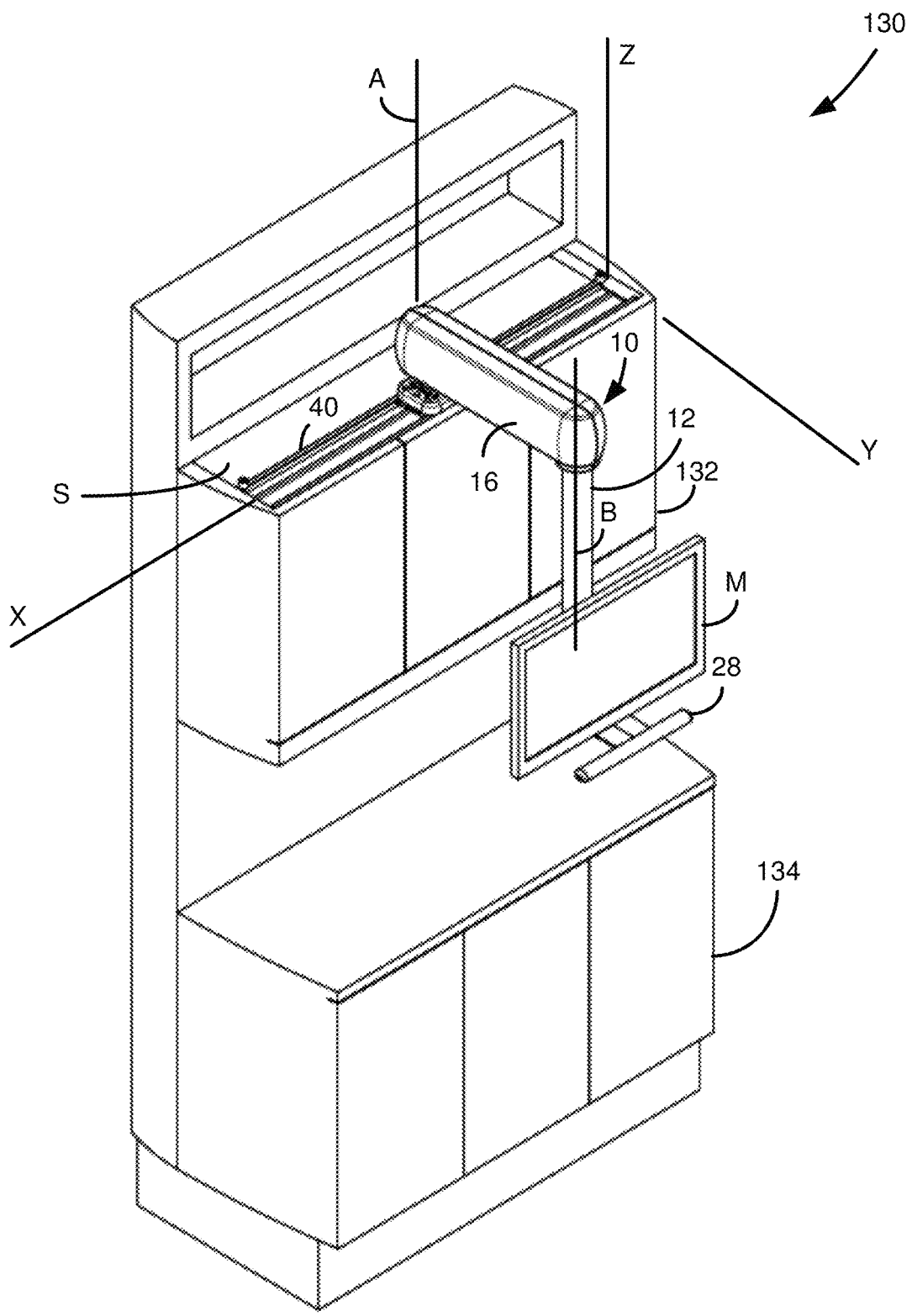
FIGS. 13-16 are front perspective, front, top and right side views, respectively, of a cabinet assembly to which the arm is mounted, showing the arm positioned in a central position.

FIG. 13 is a perspective view of the arm 10 mounted to a cabinet assembly 130. The cabinet assembly 130 has an upper bank of cabinets 132 spaced above a lower bank of cabinets 134 having a work surface 135. The cabinet assembly 130 is of a type typically found in a dental operatory, and is typically positioned at the twelve o'clock position (i.e., adjacent the head end of the reclined dental chair). In this way, the cabinet assembly 130 provides easy access to at least the dentist and in some cases, also the dental assistant.

In the illustrated implementation, the arm 10 is positioned to suspend the monitor M from an upper surface of the upper bank of cabinets 132. In the cabinet 130, the support surface S to which the arm 10 is attached is the upper surface of the upper bank of cabinets 132. In the illustrated implementation, the track 40 is provided and is positioned to extend laterally from left to right along the upper surface of the upper bank of cabinets 132. As a result, the monitor M can be translated in the direction of the x-axis, pivoted around the axis A, pivoted about the axis B, raised or lowered along the axis B (parallel to the z-axis) as well as moved relative to the distal end 14 as described above in connection with FIG. 2. In this way, the monitor M can be conveniently positioned for viewing, especially by the dentist or surgeon and in some cases, also by the dental assistant or another caregiver. There may be occasions when the patient is directed to view the monitor M, but in most cases there is another monitor provided for the patient's viewing while occupying the dental chair. The dentist and dental assistant can use the monitor to view any kind of useful information, which would include but not be limited to digital radiographs, patient records, other reference information and/or video streams of procedures, including real-time video of ongoing procedures as well as archived videos.

Figure 14:
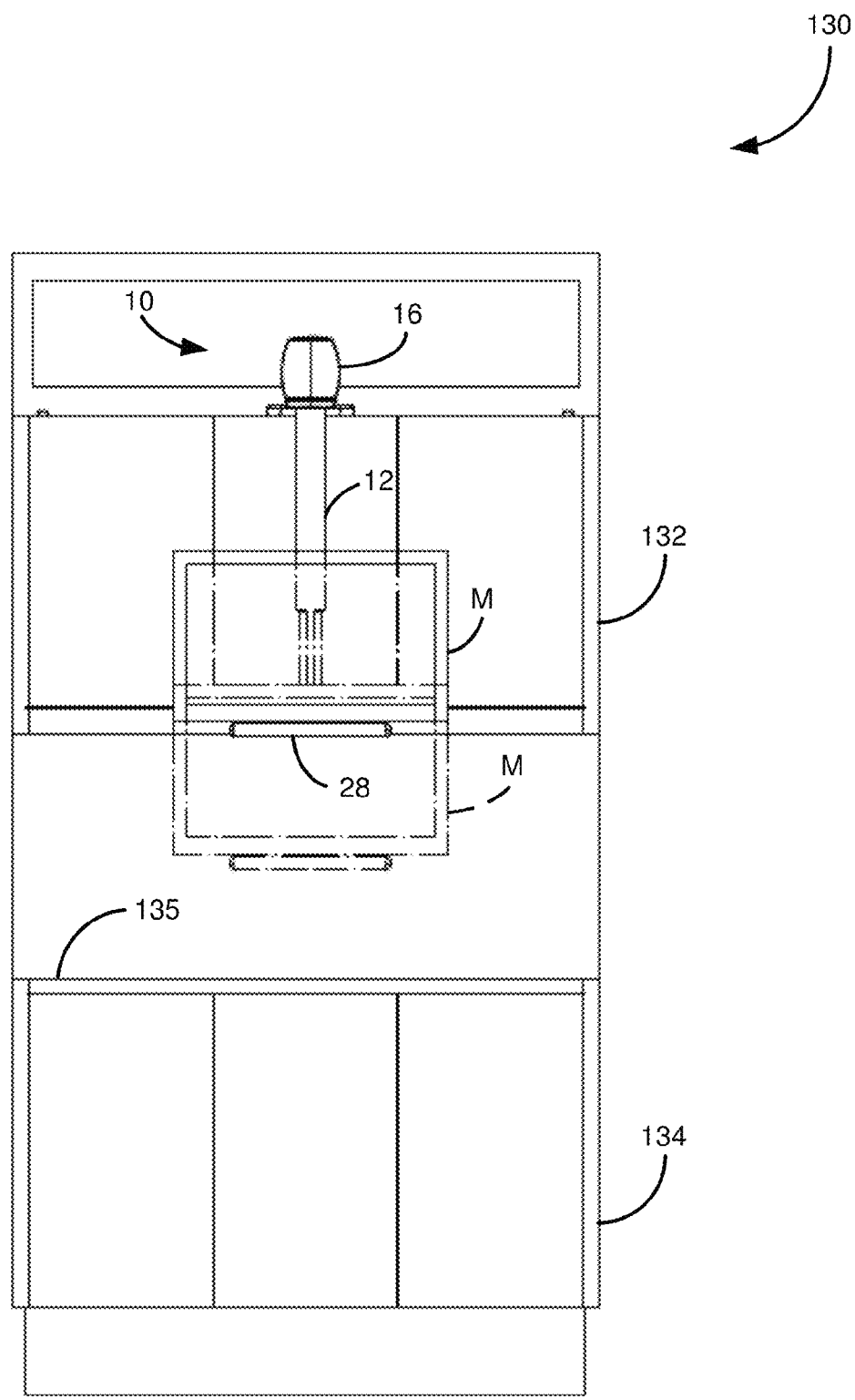
Figure 15:
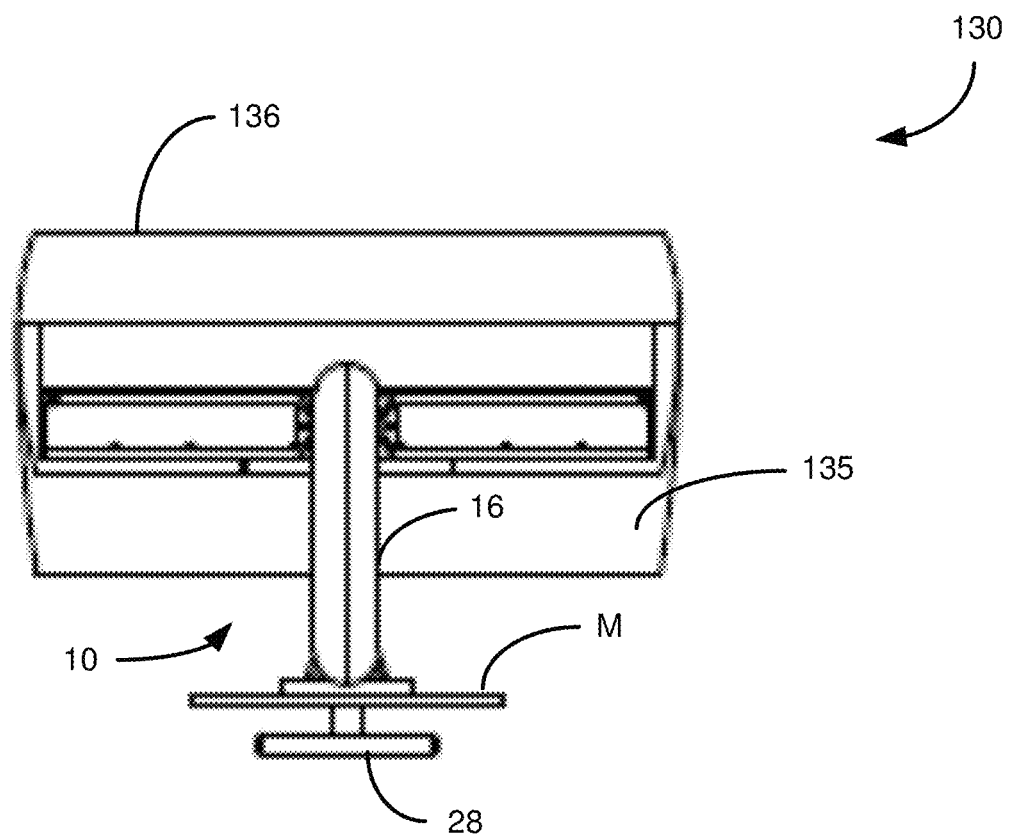
Figure 16:
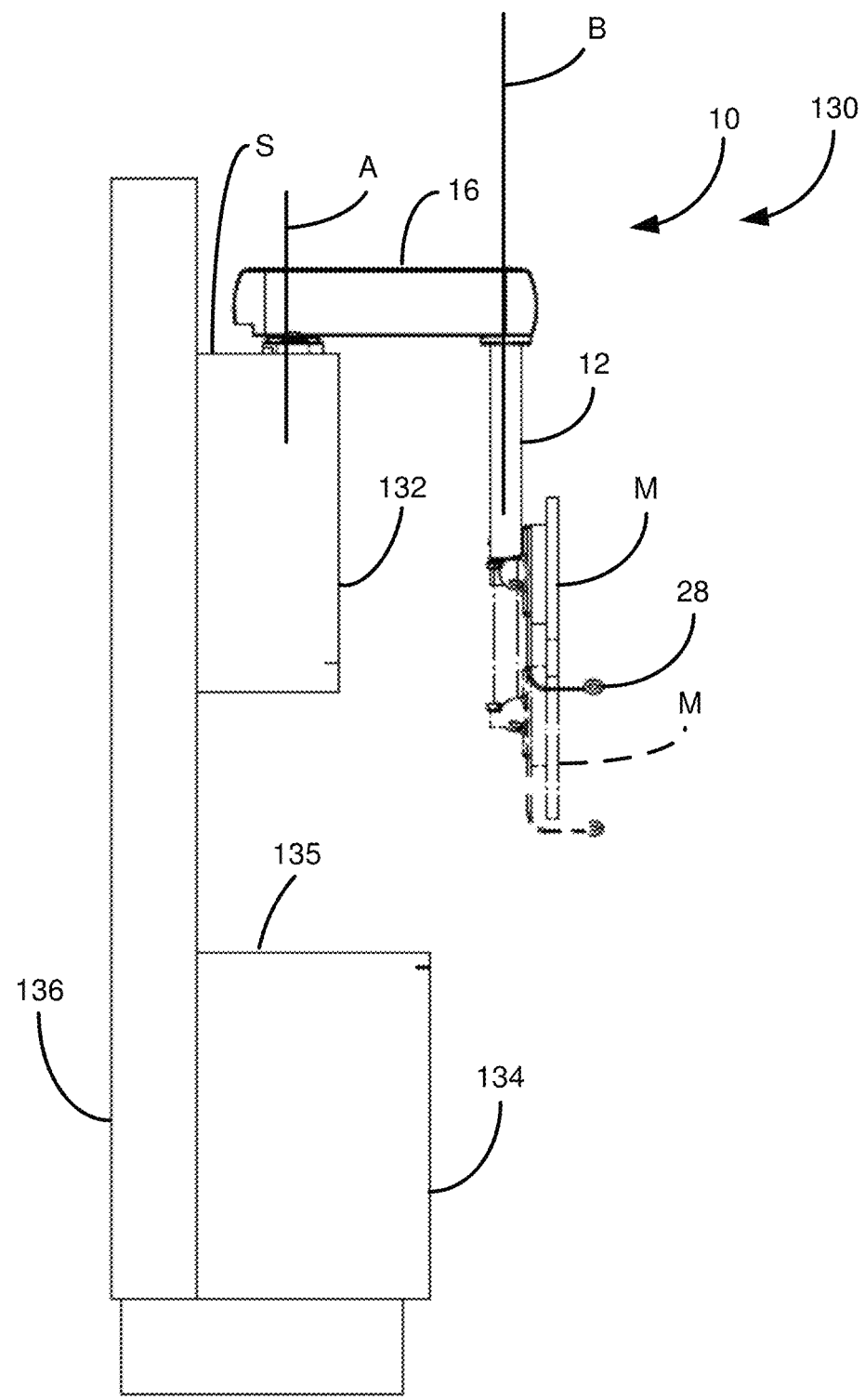
Figure 17:
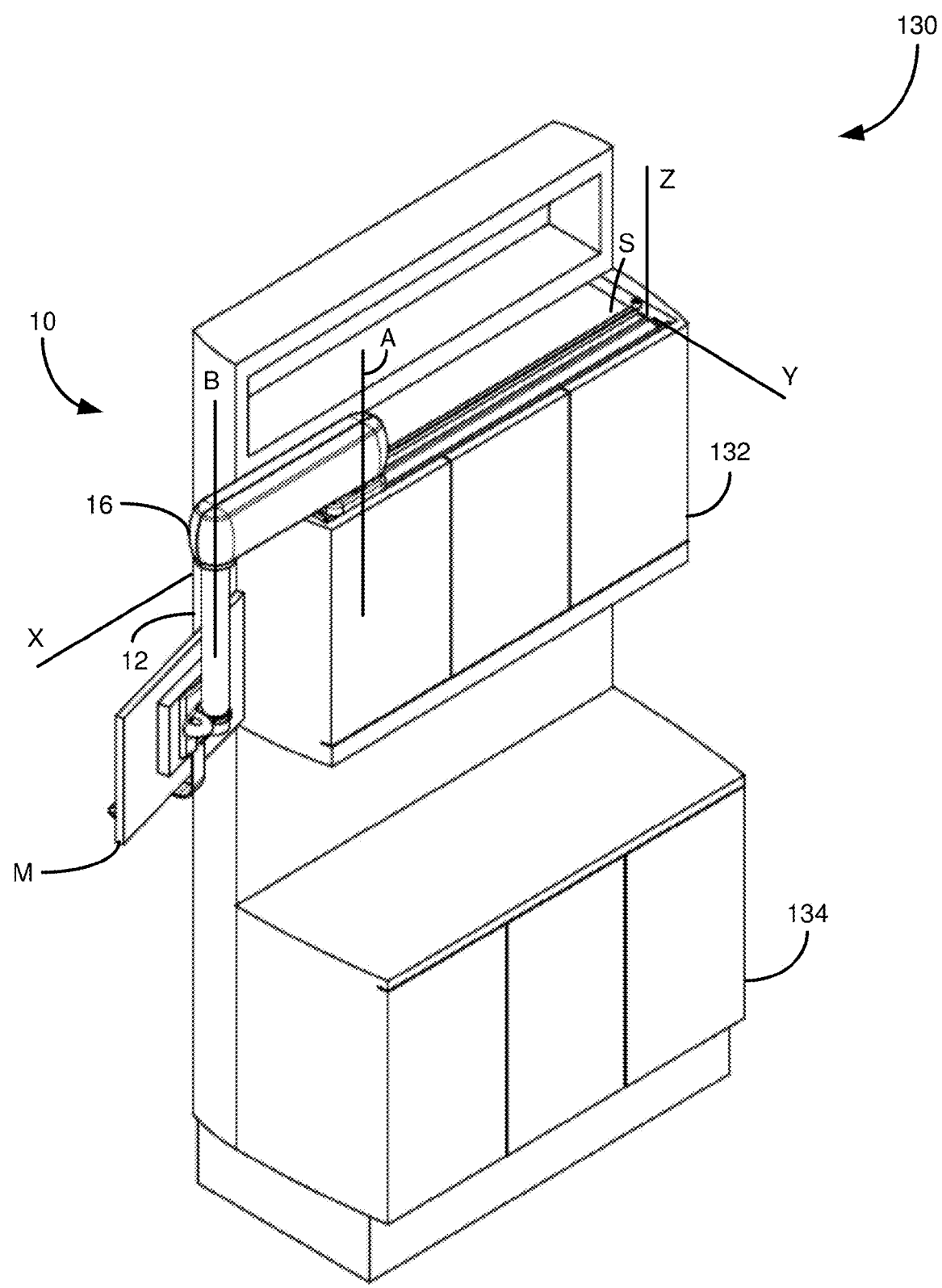
FIGS. 17-21 are front perspective, front, top, right side and rear views, respectively, of the cabinet assembly of FIG. 13, showing the arm positioned at a rightmost lateral position and pivoted outwardly with the monitor pivoted toward a rear side of the cabinet assembly.
Figure 18:
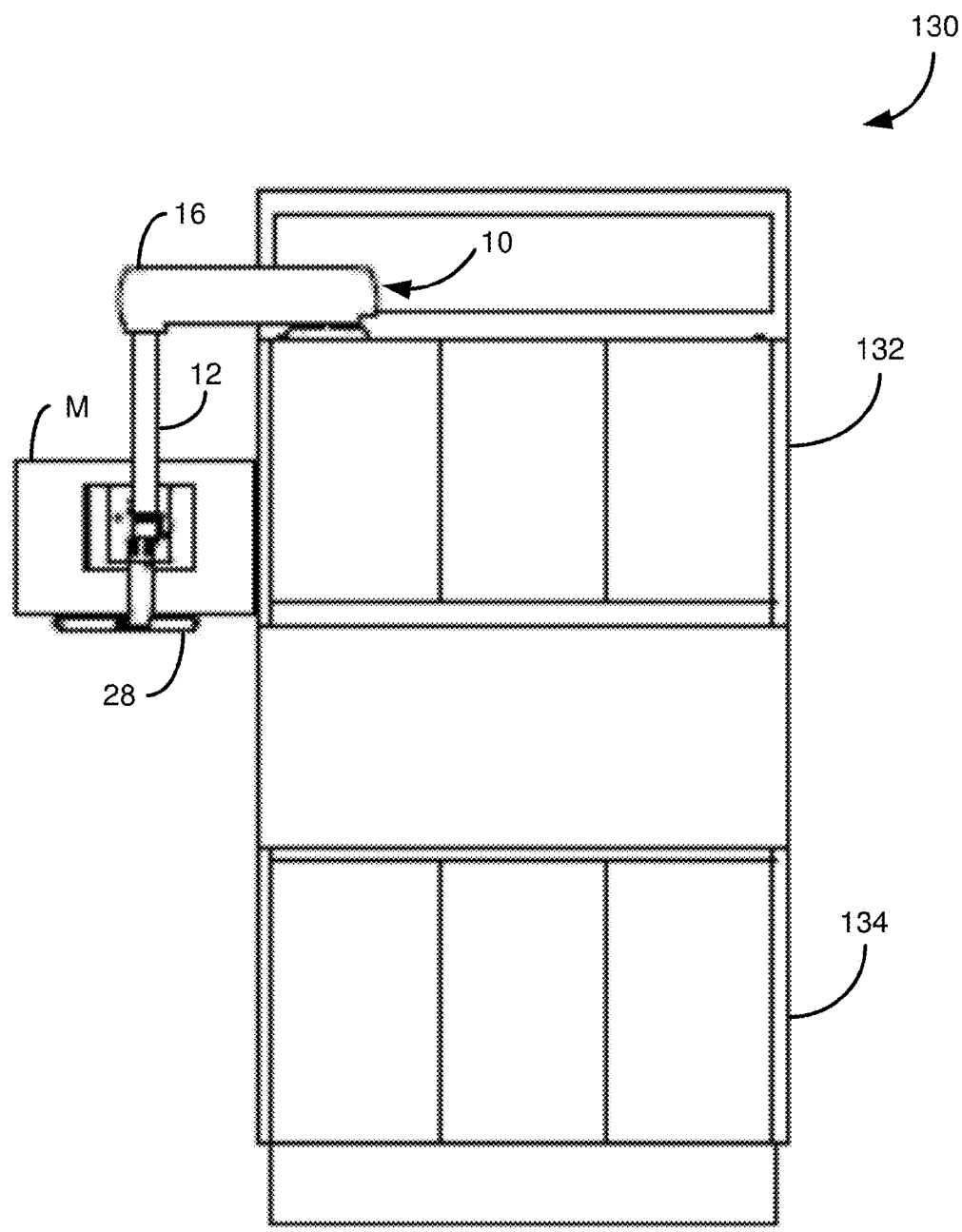
Figure 19:
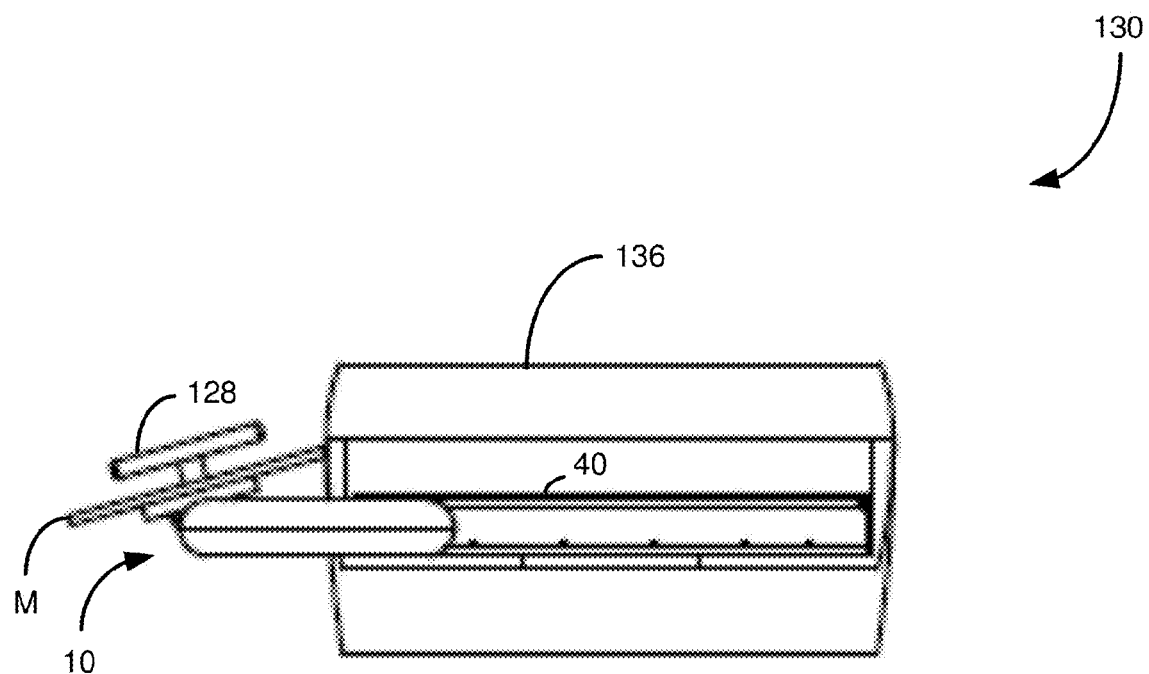
Figure 20:
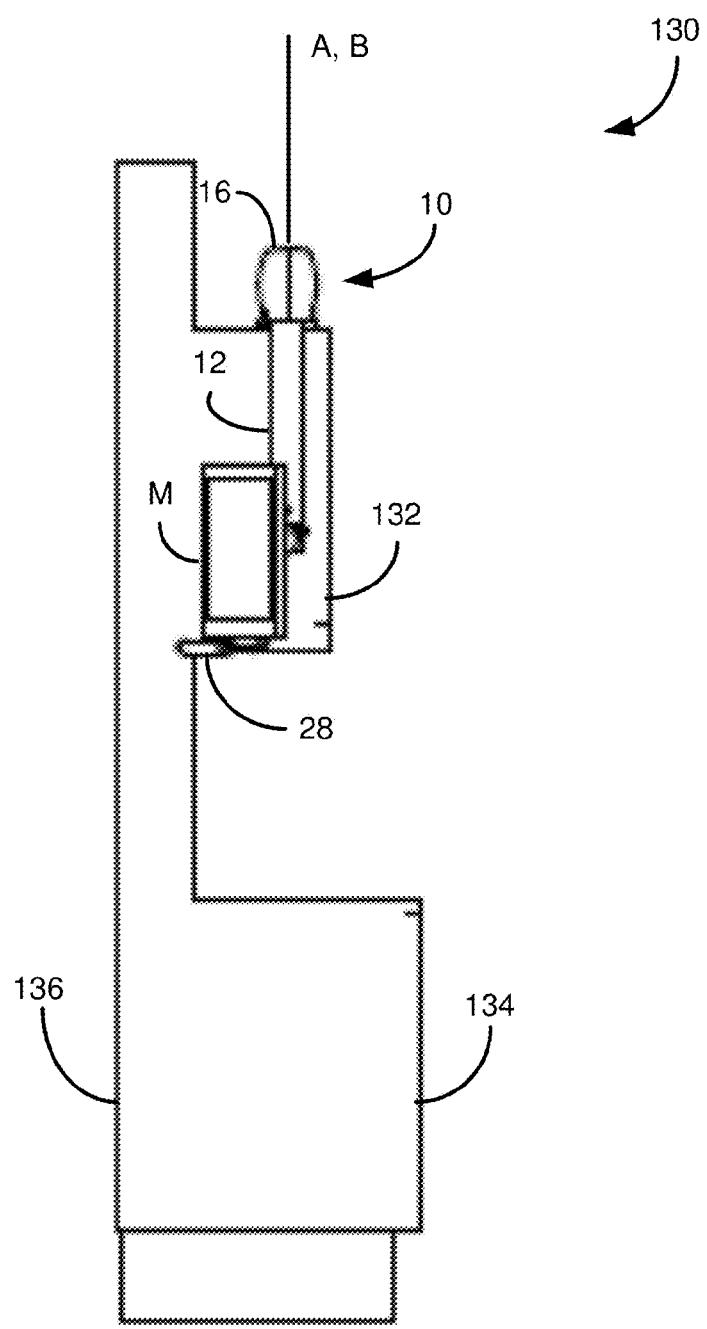

FIG. 14 shows a front view of the cabinet assembly 130 with the arm 10 in the same central position. FIG. 15 is a top plan view of the cabinet assembly 130 and the arm 10. FIG. 16 is an elevation view of a left side of the cabinet assembly 130 and the arm 10. In FIGS. 14 and 16, the monitor M is shown in its fully elevated or raised position (with the telescoping arm assembly 12 retracted) in solid lines, and in its fully lowered position (with the telescoping arm assembly 12 fully extended) in dashed lines.

FIGS. 17-20 are similar to FIGS. 13-16, but show the arm 10 positioned at the left end of the track 40, pivoted about the axis A along the left side of the cabinet assembly 130, with the monitor M further pivoted about the axis B to face rearwardly. Thus, the arm 10 provides a wide range of adjustment in positioning the monitor as desired. Further, it is easy to change between positions. Because the cord(s) from the monitor (and cable) are stored, they do not interfere with the arm's motion while changing the position of the monitor. If desired, the support member 16 can be configured to allow for it to translate as well as to pivot.

Figure 21:
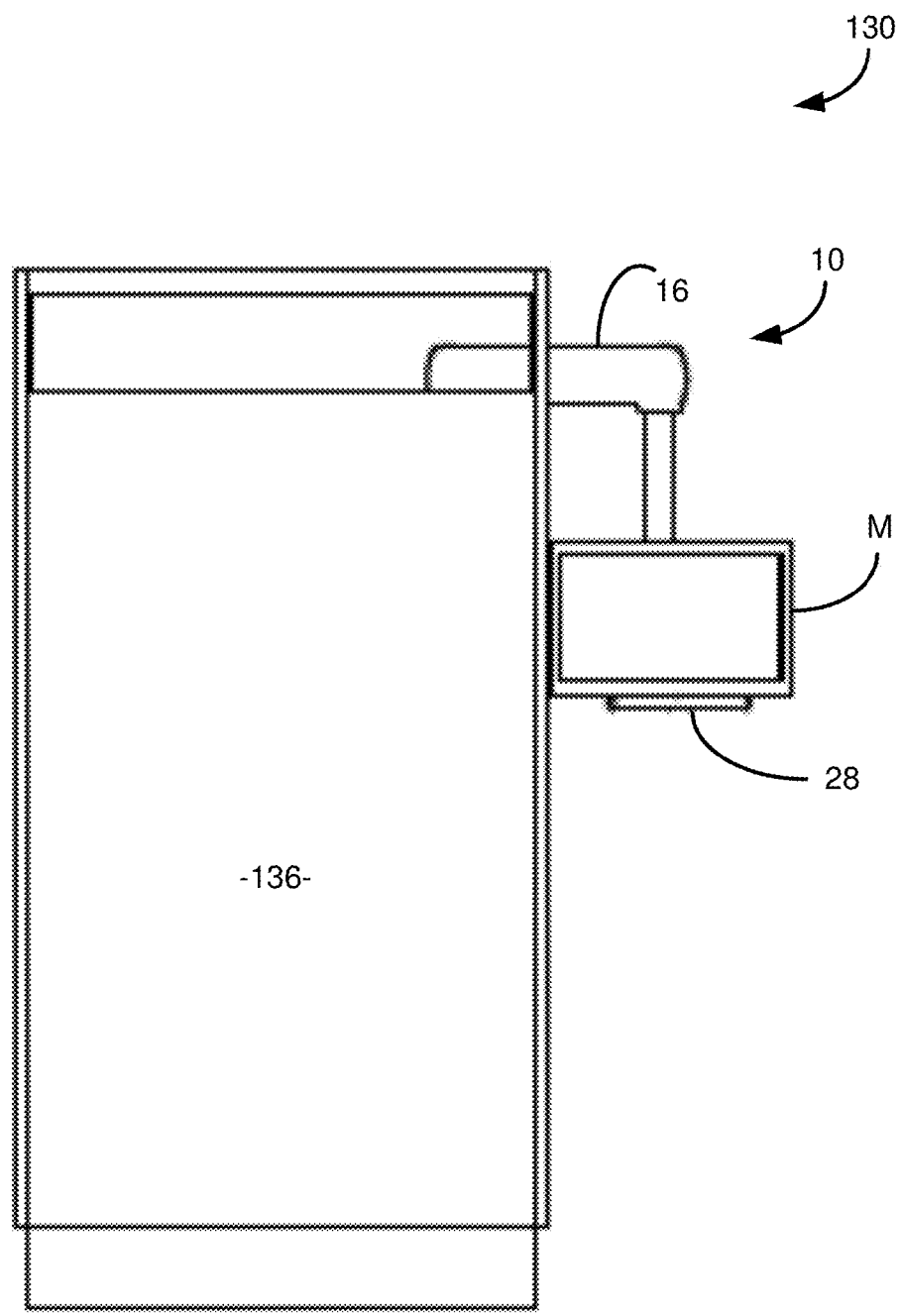

FIG. 21 is an additional view of the cabinet assembly 130 from the rear side showing the monitor M pivoted for viewing from the rear side. The position of the monitor in FIGS. 17-21 is desirable in some implementations, e.g., if there are additional controls for equipment or instruments mounted to a rear side 136 of the cabinet assembly 130. For example, in some installations, controls for x-ray equipment are mounted to the rear side 136, so allowing the monitor M to be easily pivoted for viewing by a dentist, dental assistant or other caregiver positioned near the rear side 136 is advantageous.

As described above, each of the fixed pulley 64 and movable pulley 66 can accommodate four cords and cables. If desired, even more cords and cables can be accommodated by adjusting the configuration of the pulleys accordingly. In the described implementations, the arm 10 is designed to accommodate conventional power, data and other cords of the monitor M. It would also be possible, however, to provide the arm with specially sized cables that are prepositioned around the fixed pulley 64 and movable pulley 66 and having exposed ends at the distal end 14 and adjacent the cable attachment brackets 74 for connection to the monitor and to a source of power and/or other component, respectively.

The described arm provides a wide range of adjustment to allow the monitor to be positioned conveniently for many different uses in the operatory. In addition, access to adjacent equipment and areas is maintained. Further, because of the arm's substantially enclosed construction, it is easy to maintain it in a clean condition. Because the cords are substantially covered, only minimal cleaning of their exposed portions would be required.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. An arm for supporting a monitor, comprising: a telescoping arm assembly having at least first and second telescoping members telescopingly movable relative to each other, the assembly having a distal end configured to support a monitor and a hollow interior through which multiple separate cords from the monitor can be routed;
    a support member connected proximally of the distal end to suspend the telescoping arm assembly, the support member being configured to extend transverse to the telescoping arm assembly and to be fixed to a support surface;
    a load balancing device coupled to at least one of the telescoping arm assembly or the support member, the load balancing device being configurable to exert a force to counteract a load exerted by the telescoping arm assembly and any attached monitor; and
    a cord storage device positioned at least partially within at least one of the telescoping arm assembly or the support member, the cord storage device comprising a fixed pulley and a movable pulley about which the separate cords are stored, and wherein the movable pulley translates relative to the fixed pulley as the first and second telescoping members are moved towards and away from each other, and wherein the fixed pulley and the movable pulley wind and unwind at least a first cord from the monitor and a second cord from the monitor as the first and second telescoping members are moved towards and away from each other;
    wherein the fixed pulley has a first cord section and a second cord section, and wherein the movable pulley has a corresponding first cord section and a corresponding second cord section, and wherein the respective first and second cord sections are axially separated from each other.

2. The arm of claim 1, wherein the load balancing device is positioned at least partially within at least one of the telescoping arm assembly or the support member.

3. The arm of claim 2, wherein the load balancing device has a movable end connected to a movable pulley of the cord storage device.

4. The arm of claim 2, wherein the load balancing device comprises an air actuator having a regulator adjustable to balance the load.

5. The arm of claim 2, wherein the load balancing device is configured to move with the cord storage device.

6. The arm of claim 2, wherein the load balancing device is substantially enclosed within the arm.

7. The arm of claim 1, wherein the telescoping arm assembly is configured to extend approximately vertically, and wherein the support member is configured to extend approximately horizontally.

8. The arm of claim 1, wherein the support member is configured for attachment to an approximately horizontal support surface with the telescoping arm assembly suspended approximately vertically from the support member.

9. The arm of claim 1, wherein the load balancing device comprises an air cylinder.

10. The arm of claim 1, wherein the load balancing device comprises a spring.

11. The arm of claim 1, wherein the fixed pulley and the movable pulley are each configured to store the first cord, the second cord and a load supporting cable.

12. The arm of claim 11, wherein the first cord is a power cord and the second cord is a video cord.

13. The arm of claim 11, wherein the load supporting cable has a first end attached to the support member and an opposite end attached adjacent the distal end of the telescoping arm assembly.

14. The arm of claim 1, further comprising a brake actuatable to lock the first and second support members at a desired position relative to each other.

15. The arm of claim 1, wherein the telescoping arm assembly is pivotably connected to the support member.

16. The arm of claim 1, further comprising a track configured for attachment to a support surface and defining a lateral axis, and wherein the support member is slidably mountable to the track such that the distal end of the telescoping arm assembly can be translated laterally by moving the support member along the track.

17. The arm of claim 16, wherein the track is configured for mounting to a top surface of a dental cabinet.

18. The arm of claim 17, wherein the track is configured for mounting adjacent a front side of a cabinet, and wherein the support member is positionable to extend beyond the front side of the cabinet and is pivotable such that at outer track positions, the support member can be pivoted through an angle greater than about 70 degrees to position the telescoping arm assembly and any attached monitor adjacent one of the sides of the cabinet bordering the front side.

19. The arm of claim 18, wherein the support member can be pivoted to position any attached monitor adjacent a back side of the cabinet.

20. The arm of claim 1, wherein the support member is pivotably mountable to a support surface.

21. The arm of claim 1, wherein the cord storage device is substantially enclosed within the arm.

22. The arm of claim 1, wherein the telescoping arm assembly provides at least about ten inches of travel.

23. The arm of claim 1, wherein the support member includes a cord opening through which an end of the cord can be routed for connection to a source of power or to another component.

24. The arm of claim 23, wherein the cord opening is positioned to be adjacent to a support surface to which the support member is attached.

25. An arm for supporting a monitor, comprising:
   a telescoping arm assembly having at least first and second telescoping members telescopingly movable relative to each other, the assembly having a distal end configured to support a monitor and a hollow interior through which cords from the monitor can be routed;
   a support member connected proximally of the distal end to suspend the telescoping arm assembly, the support member being configured to extend transverse to the telescoping arm assembly and to be fixed to a support surface;
   a track configured for attachment to a support surface and defining a lateral axis, the track being configured to slidably receive an end of the support member such that the distal end of the telescoping arm assembly can be translated laterally by moving the support member along the track;
   a load balancing device positioned at least partially within at least one of the telescoping arm assembly or the support member, the load balancing device being configurable to exert a force to counteract a load exerted by the telescoping arm assembly and any attached monitor; and
   a cord storage device positioned at least partially within at least one of the telescoping arm assembly or the support member and coupled to the load balancing device, the cord storage device comprising a fixed pulley and a movable pulley about which the cords are stored, and wherein the movable pulley translates relative to the fixed pulley as the first and second telescoping members are moved towards and away from each other, and wherein the fixed pulley and the movable pulley wind and unwind at least a first cord from the monitor and a second cord from the monitor separate from the first cord as the first and second telescoping members are moved towards and away from each other.

* * * * *